(12) United States Patent
Marini et al.

(10) Patent No.: US 9,970,360 B2
(45) Date of Patent: May 15, 2018

(54) GAS TURBINE ENGINE CONFIGURED TO SHAPE POWER OUTPUT

(71) Applicants: Bonnie D. Marini, Oviedo, FL (US); Brian J. Bohinsky, Winter Springs, FL (US)

(72) Inventors: Bonnie D. Marini, Oviedo, FL (US); Brian J. Bohinsky, Winter Springs, FL (US)

(73) Assignee: SIEMENS AKTIENGESELLSCHAFT, München (DE)

(*) Notice: Subject to any disclaimer, the term of this patent is extended or adjusted under 35 U.S.C. 154(b) by 1298 days.

(21) Appl. No.: 13/754,936

(22) Filed: Jan. 31, 2013

(65) Prior Publication Data

US 2013/0227954 A1 Sep. 5, 2013

Related U.S. Application Data

(60) Provisional application No. 61/606,537, filed on Mar. 5, 2012.

(51) Int. Cl.
| | |
|---|---|
| F02C 1/00 | (2006.01) |
| F02C 9/20 | (2006.01) |
| F02C 9/28 | (2006.01) |
| F02C 9/54 | (2006.01) |
| F02C 7/057 | (2006.01) |

(52) U.S. Cl.
CPC ............ *F02C 9/20* (2013.01); *F02C 7/057* (2013.01); *F02C 9/28* (2013.01); *F02C 9/54* (2013.01); *F05D 2270/05* (2013.01); *F05D 2270/20* (2013.01)

(58) Field of Classification Search
CPC ..................................... F02C 9/19; F23R 3/26
See application file for complete search history.

(56) References Cited

U.S. PATENT DOCUMENTS

| | | | |
|---|---|---|---|
| 3,394,265 A | 7/1968 | Hendrickson | |
| 3,974,645 A * | 8/1976 | Smith | F01K 23/105 290/40 C |
| 3,975,900 A * | 8/1976 | Pfefferle | F23R 3/26 60/39.23 |
| 5,634,327 A | 6/1997 | Kamber et al. | |

(Continued)

FOREIGN PATENT DOCUMENTS

| | | |
|---|---|---|
| CN | 1771385 A | 5/2006 |
| CN | 101852134 A | 10/2010 |

OTHER PUBLICATIONS

Marini, Bonnie; Siemens Releases "Shaping Power" Option for Renewables Integration; http://www.powermag.com; Dec. 1, 2011.

(Continued)

*Primary Examiner* — Gerald L Sung

(57) ABSTRACT

A gas turbine engine and method of controlling the gas turbine engine that may be utilized in a power grid having a plurality of additional power generation sources. The gas turbine engine is configured with a compressor having an enlarged mass flow volume. The gas turbine engine may be operated at a base load for supplying power to the power grid at a part load and optimum efficiency for the engine, and may be ramped up to a higher output to supply a peak load output to the power grid.

6 Claims, 6 Drawing Sheets

(56) References Cited

U.S. PATENT DOCUMENTS

| | | | |
|---|---|---|---|
| 5,661,967 A * | 9/1997 | Farkas | F02C 7/26 60/774 |
| 5,768,884 A * | 6/1998 | Hines | F02C 7/143 60/728 |
| 6,164,057 A | 12/2000 | Rowen et al. | |
| 6,226,974 B1 | 5/2001 | Andrew et al. | |
| 6,438,484 B1 | 8/2002 | Andrew et al. | |
| 6,718,771 B1 | 4/2004 | Kopko | |
| 7,104,071 B2 | 9/2006 | Braun et al. | |
| 7,269,953 B2 | 9/2007 | Gadde et al. | |
| 7,293,415 B2 | 11/2007 | Hoffmann et al. | |
| 7,644,573 B2 | 1/2010 | Smith et al. | |
| 7,874,139 B2 | 1/2011 | Briesch et al. | |
| 2006/0042258 A1* | 3/2006 | Gadde | F01D 17/162 60/772 |
| 2007/0013195 A1 | 1/2007 | Mukavetz et al. | |
| 2010/0175385 A1* | 7/2010 | Plant | F02C 3/10 60/773 |
| 2010/0198419 A1 | 8/2010 | Sonoda et al. | |
| 2011/0037276 A1 | 2/2011 | Hoffmann et al. | |
| 2011/0210555 A1* | 9/2011 | Xia | F01K 13/02 290/52 |

OTHER PUBLICATIONS

Savic, Sasha et al.; The Next Generation KA24/GT24 From Alstom, The Pioneer in Operational Flexibility; Alstom Power; www.alstom.com/power; 2011.

* cited by examiner

GAS TURBINE ENGINE CONFIGURED TO SHAPE POWER OUTPUT

CROSS REFERENCE TO RELATED APPLICATION

This application claims the benefit of U.S. Provisional Patent Application Ser. No. 61/606,537, filed Mar. 5, 2012, entitled "GAS TURBINE ENGINE CONFIGURED TO SHAPE POWER OUTPUT", the entire disclosure of which is incorporated by reference herein.

FIELD OF THE INVENTION

This invention relates to a gas turbine engine and, more particularly, to a gas turbine engine for producing power in base load and peaking power on a power grid.

BACKGROUND OF THE INVENTION

Gas turbines have been in use for electric power production for decades. Over that time, the industry has changed significantly and this has driven a change in the desired attributes and capabilities for gas turbines used for power production. In the 1980's and early 1990's, gas turbines were primarily used in base load operation. Since that time operational requirements have changed and gas turbines are used to load follow, changing operating load frequently over time. This requirement continues to expand and with the recent introduction of a larger portfolio of wind and other sources where ramp can not be completely controlled or predicted, it is desirable to have gas turbines which are able to ramp up and down quickly. To address the demands of base load, fluctuating load and peaking load, various sizes of gas turbines are employed to be able to address the desired amount of power required for each demand.

Industrial gas turbines have historically been used to produce as much power as they could, resulting in engine designs that operate at maximum efficiency at the maximum load. This approach to gas turbine design is in large part based on the efficiency characteristics of the gas turbine. For a given gas turbine design, the efficiency curve has a characteristic shape. From an aerodynamic perspective, from the lowest operating power point to the maximum operating point, the efficiency curve slopes slowly up to a maximum efficiency. However, once the maximum efficiency is reached, it drops sharply with further increases in power. This drop is due to aerodynamic losses that occur in the turbine when there is flow beyond the optimum design for a row of airfoils. Due to this phenomenon, it has been industry practice to design and/or control the engines such that they reach their maximum power at a point very near to, but not past their maximum efficiency.

In the past, gas turbines operated as base load units, or for peaking power supply for short periods. Base load units ran at maximum power for extended periods. Peakers were expected to cycle frequently in order to supply additional power when demand increased. A regional power grid in the U.S. might be supplied by a combination of nuclear, coal, wind, and gas-fired generation, with gas ramping on and off or up and down for peaks in demand during the day, including providing the additional power requirements of the power grid as the output of renewable sources, e.g., solar and wind, fluctuate.

As the need for more operational flexibility was introduced, engine designs to flatten the efficiency curve emerged and some industrial designs started to introduce some of the features from aircraft engines into industrial engines. Among these features was the introduction of more than one row of compressor variable vanes. In many industrial gas turbine designs, only one row of vanes is used to adjust the mass flow of air entering the compressor. When only one row is used, large mass flow reductions result in large reductions in compressor efficiency. When more than one row is used, the compressor mass flow can be changed significantly without significantly changing the compressor efficiency. Though an improvement, this lower loss in efficiency in the compressor with mass flow does not change the way the turbine reacts to the mass flow, and gas turbines are generally currently designed and/or controlled such that the maximum power and maximum efficiency are very close.

SUMMARY OF THE INVENTION

In accordance with an aspect of the invention, a gas turbine engine system is provided which is configured for power generation. The gas turbine engine comprises a compressor, a combustor and a turbine. The compressor provides compressed air to the combustor for combustion with a fuel to produce a hot working gas, and the turbine receives the hot working gas to produce power. The compressor and turbine are configured with reference to a reference engine, wherein the reference engine defines a configuration having a predetermined mass flow for a predetermined turbine inlet temperature to produce an optimum efficiency at a predetermined compressor inlet condition at a maximum power output for the reference engine. The turbine of the present invention comprises a configuration substantially identical to the turbine of the reference engine. However, the compressor has a configuration different than the compressor of the reference engine, wherein the compressor of the present invention is sized larger than the compressor of the reference engine to provide a maximum flow capability of the compressor greater than an upper flow capability of the compressor of the reference engine. Further, inlet guide vanes (IGVs) are provided at an inlet to the compressor, the IGVs have a position for reducing the mass flow of air into the compressor to a flow less than the maximum flow capability for operating the engine at an optimum efficiency at the predetermined turbine inlet temperature of the reference engine.

The predetermined position of the IGVs defines a mass flow of air entering the engine compressor for producing a base load output, and opening the IGVs from the predetermined position toward a more open position may increase the power output of the gas turbine engine system.

The movement of the IGVs toward the more open position may produce the increase in power output at a constant turbine inlet temperature defined by the predetermined turbine inlet temperature.

The increase in power output may be an increase of at least 10% above the base load output with the movement of the IGVs toward the more open position.

The IGVs may be movable from the predetermined position toward a closed position, reducing the mass flow of air to the compressor, wherein the IGVs may be adapted to reduce the mass flow of air into the compressor at least 20% below the mass flow of air at the base load power output to provide a reduced part load power output.

The movement of the IGVs toward the more open position may be adapted to provide a constant base load power output with increasing compressor inlet air temperatures above the predetermined compressor inlet condition.

The predetermined compressor inlet condition may be the ISO conditions for a gas turbine engine.

The compressor may have a plurality of stages, each stage defined by a row of stationary vanes and a row of rotating blades, and wherein about the front one-third of the stages of the compressor, at an inlet end thereof, may be sized with a larger outer diameter than the corresponding stages of the compressor of the reference engine.

In accordance with another aspect of the invention, a method of controlling a power plant for producing power on power grid is provided, the method comprising:

providing a gas turbine engine system configured for power generation, the providing a gas turbine engine system including:
  providing a compressor, a combustor and a turbine, the compressor providing compressed air to the combustor for combustion with a fuel to produce a hot working gas and the turbine receiving the hot working gas to produce power;
  the step of providing the compressor, combustor and turbine including configuring the compressor and turbine with reference to a reference engine, wherein the reference engine defines a configuration having a predetermined mass flow for a predetermined turbine inlet temperature to produce an optimum efficiency at a predetermined compressor inlet condition corresponding to a target inlet air temperature, a target relative humidity and target atmospheric pressure producing a maximum power output for the reference engine, wherein the turbine comprises a configuration substantially identical to the turbine of the reference engine;
  wherein the compressor has a configuration different than the compressor of the reference engine, wherein the compressor is sized larger than the compressor of the reference engine to provide a maximum flow capability of the compressor greater than an upper flow capability of the compressor of the reference engine;
  providing inlet guide vanes (IGVs) at an inlet to the compressor, the IGVs having a position for reducing the mass flow of air into the compressor to a flow less than the maximum flow capability for operating the engine at an optimum efficiency at the predetermined turbine inlet temperature of the reference engine; and
operating the gas turbine engine system in a first mode to provide a constant power output with a continuously increasing compressor inlet temperature above the target inlet air temperature, the step of operating the gas turbine system comprising:
  a) moving the IGVs to increase the mass flow of air entering the compressor; and
  b) maintaining the turbine inlet temperature constant at the predetermined turbine inlet temperature during the movement of the IGVs to increase the mass flow of air.

The step of operating the gas turbine engine system may further include:
  c) a second mode increasing the net power output of the power plant in response to steps a) and b) with a corresponding decrease in efficiency in the gas turbine engine system below the optimum efficiency.

The power output of the power plant when the IGVs are at the predetermined position may be a base load output.

The increase in power output of step c) may be at least 10% above the base load output.

The method may additionally include moving the IGVs toward a closed position to reduce the mass flow of air into the compressor by at least 15% below the mass flow of air at the base load power output, thereby providing a reduced part load power output.

The reduced part load power output may be at least 15% below the base load power output.

The method may additionally include providing the power plant with a steam turbine, and providing the gas turbine engine system with a heat recovery steam generator (HRSG), and wherein:
  step c) provides an increase in power at a first net power cost increase defined as a first (change in net heat rate)/(change in net power output); and
  subsequent to step c), increasing the power plant output by providing duct firing to the gas turbine engine system to increase steam production in the HRSG, wherein the duct firing provides an increase in a net power output of the power plant at a second net power cost increase defined as a second (change in net heat rate)/(change in net power output) that is substantially greater than the first net power cost increase.

The power increase of step c) at the first net power cost increase may provide at least a 10% increase in the net output of the power plant above the base load output with a corresponding increase in net heat rate of less than 2%.

At the second net power cost increase, about a 10% increase in the net output of the power plant may be produced subsequent to the power increase provided at the first net power cost increase with a corresponding increase in net heat rate of greater than 2%.

The second net power cost increase may be about eight times greater than the first net power cost increase.

The net power increase provided at the first net power cost increase may be at least equal to or greater than the net power increase provided by the second net power cost increase.

The net power increase provided at the first net power cost increase may occur without affecting a service interval influenced by temperatures of the hot working gas within the turbine of the gas turbine engine system.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

The present invention relates to a gas turbine engine and method of controlling the gas turbine engine in relation to a power grid having a plurality of additional power generation sources. In particular, the power grid may include one or more renewable energy sources, such as a wind power source and a solar power source. In addition, it may be expected that the power grid includes a plurality of other contributing power sources that may include, but is not necessarily limited to, one or more nuclear, coal, and gas turbine based power sources.

Figure 1:
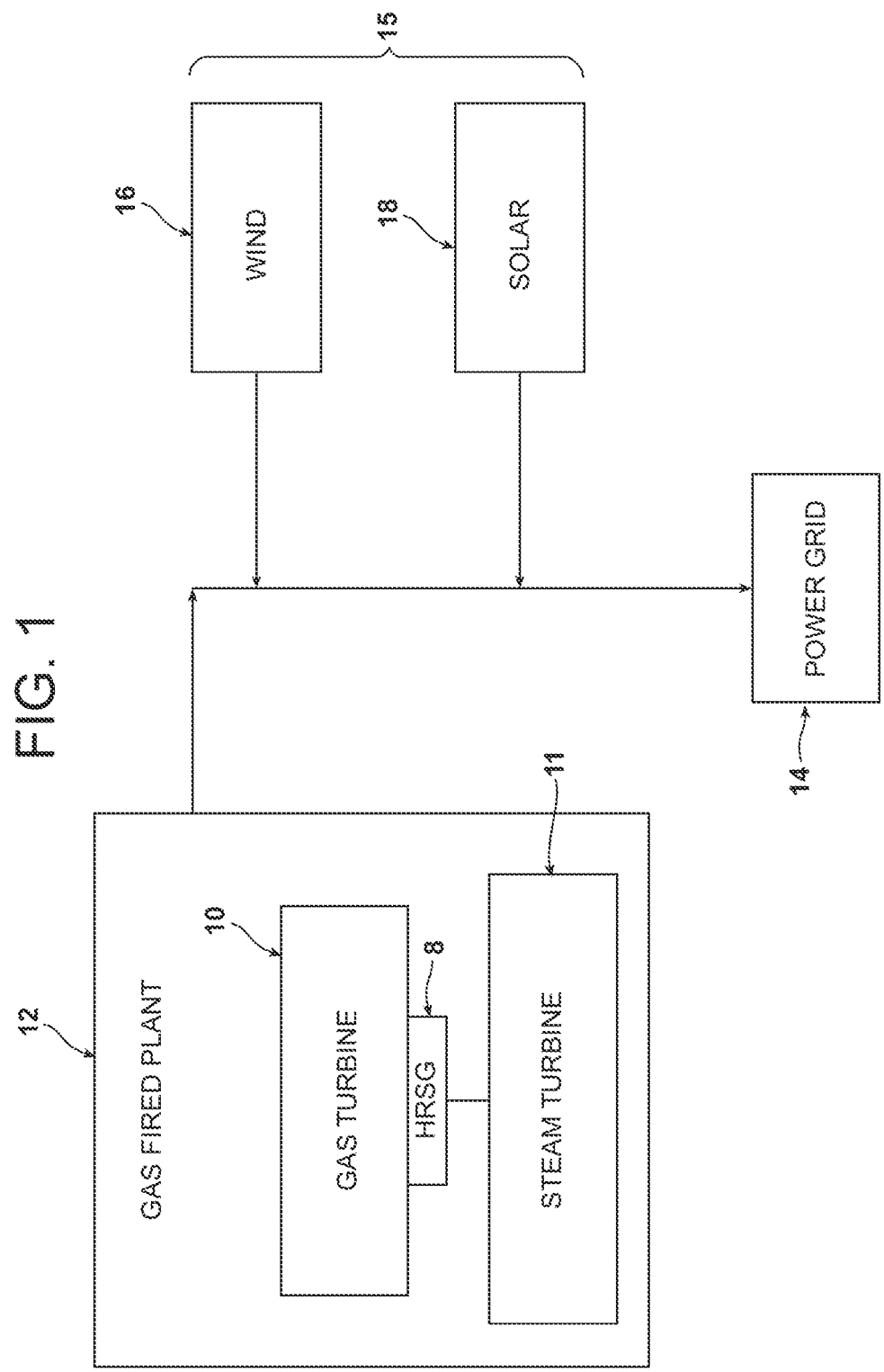
FIG. 1 is a diagrammatic view of a power grid including a gas turbine engine in accordance with an aspect of the present invention.
Figure 2:
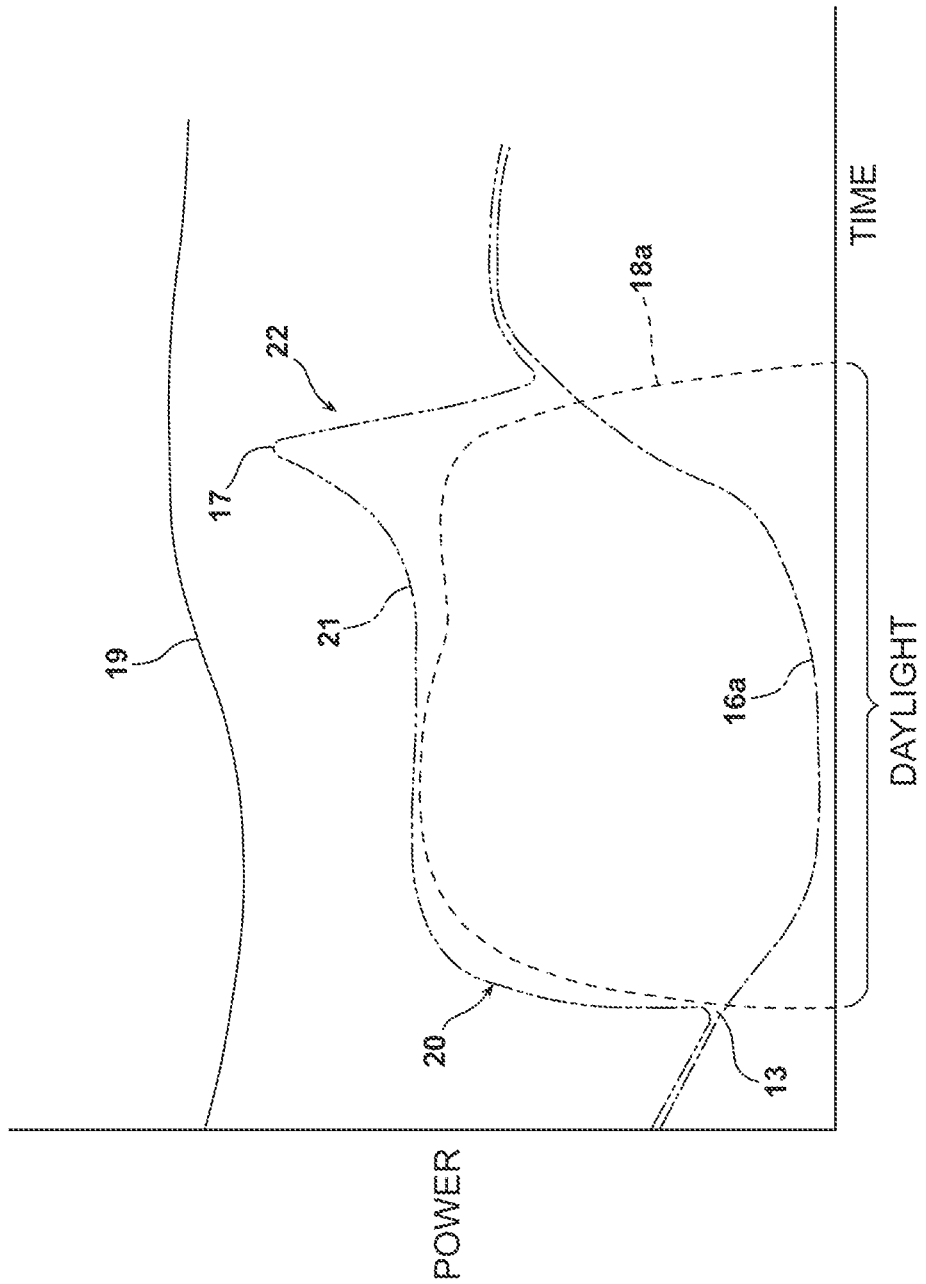
FIG. 2 is a graph illustrating variations in energy provided to the power grid by renewable energy sources.

FIG. 1 illustrates a gas turbine engine 10, which may also be referred to as a gas turbine engine system, that may be located in a gas fired power plant 12 and connected to a power grid 14. The plant 12 may include only the gas turbine engine 10, or may comprise, for example, a combined cycle plant including a bottoming cycle, such as may be provided by a steam turbine 11 fueled by steam utilizing heat in exhaust gases from the gas turbine engine 10. The demand of the power grid 14 may further be supplied from other sources which for the present illustration include renewable energy sources 15 including a wind powered source 16 and a solar powered source 18. As is seen in FIG. 2, the various power supplies are provided to meet a demand, represented by line 19, which may fluctuate during any given time period, wherein power available from wind powered sources is depicted by line 16a, power available from solar powered sources is depicted by line 18a, and combined wind and solar power is depicted by line 21.

The renewable energy sources 15 do not typically represent dispatchable energy generation. That is, the output available from the renewable energy sources 15 cannot be "turned on" on demand, and the power from these sources is typically dispatched whenever it is available in order to maximize utilization as energy becomes available from these sources. Thus, in addition to the variations in demand represented by line 19, the contribution of power from the renewable energy sources 15 may fluctuate widely depending on the time of day and climate conditions, as depicted at time locations 13 and 17. For example, the combined power input to the power grid 14 from renewable energy sources 15 may ramp up sharply, as illustrated by section 20 and the left portion of section 22 of the graph of FIG. 2. Similarly, the combined power input may decrease sharply, as illustrated by the right portion of section 22 of the graph of FIG. 2. Accordingly, the increased use of renewable energy sources 15 has introduced a requirement that the dispatchable energy generation sources, such as the gas fired plant 12, compensate for decreases and increases in the energy supply to the power grid 14, and respond at a rate and magnitude comparable the ramp up and ramp down rates and magnitudes of the changes introduced by the renewable energy sources 15.

It may be noted that although the renewable energy sources 15 are used as an example of the source of changes introduced to the power grid 14 requiring a response by dispatchable energy sources, unless otherwise indicated by the claims, the present invention is not necessarily limited to this source of varying power on the power grid 14. That is, the aspects of the invention described herein may have a broad range of application to providing a gas turbine engine 10 configured for responding to a substantial demand for a ramp up or ramp down in power output.

During a typical operation, there may be a reduced power requirement on base load power generation plants, such as may occur during certain time periods when an increased level of power is available from the renewable energy sources 15. Alternatively, when the available power from renewable energy sources 15 falls, it is necessary to have additional capacity readily available from base load plants, such as the gas fired power plant 12, as well as may be provided by nuclear power plants and coal fired power plants. As the capacity of renewable energy sources 15 increases, along with an associated reliance of the power grid 14 on these renewable sources 15, it becomes necessary to increase the flexibility of the gas fired plants 12 to respond to the variations introduced by the renewable sources 15. In particular, in some regions the amount of renewable energy available to the grid 14 can be very large, with an associated requirement for a large ramp rate from the gas fired plants 12 to backstop fluctuations in energy generation from the renewable sources 15.

Various approaches may be implemented to provide additional power from base load power plants in order to compensate for the varying amounts of energy from the renewable sources. For example, it is possible to provide a low level of peaking power from a gas turbine engine, where the engine is operated at a higher output than the rated base load output for the engine for a limited period of time. Additionally, in the case of combined cycle power plants, duct firing may be used to increase the steam energy supply to a steam turbine. When employing peaking power, the gas turbine engine is typically controlled to operate at temperatures higher than base load temperature. In this scenario engine part life is sacrificed to obtain the additional power, but typically the engine efficiency is maintained or even increased. That is, the additional gas turbine engine output obtained through increased turbine inlet temperatures can adversely impact the life expectancy of the turbine parts exposed to the high temperatures of the hot working gases passing through the turbine.

In accordance with an aspect of the invention, the gas turbine engine 10 is configured to provide an additional output capability above base load output, and to additionally provide an increased output without impacting the life expectancy of the turbine components. In relation to the turbine engine 10, it should be understood that a gas turbine is typically designed with a compressor providing compressed air for combustion to be supplied as a hot working gas to the turbine, where the compressor is sized or configured to provide a maximum mass flow of air corresponding to an optimum efficiency of the engine at a predetermined turbine inlet temperature. Additionally, the design of gas turbine engines is typically performed with reference to certain standardized environmental conditions, referred to as ISO conditions. The standard conditions (ISO conditions) used by the gas turbine industry are listed in ISO 3977-2 and include 59 F/15 C, 14.7 psia/1.013 bar and 60% relative humidity.

In accordance with a general aspect of the invention, the gas turbine engine 10 is configured to provide an increase in output power at a relatively high ramp-up rate, as compared to a turbine engine with a similar or lesser rated power output, and is configured to do so without substantially affecting the hot component life-span or the scheduled maintenance for these components. That is, the gas turbine engine 10 is configured to provide an increased power output above a base load output without impacting, or with a negligible impact, on the component life of the engine 10. The described aspects of the invention are provided by increasing the mass flow through the engine 10 to provide an increase in power output from the engine without requiring or providing an increase in the turbine inlet temperature. In particular, the increased power output of the engine 10 is provided by increasing the mass flow above the mass flow required for operating the engine at a base load point with maximum efficiency at ISO conditions, or some other identified or predetermined target ambient condition.

Figure 3:
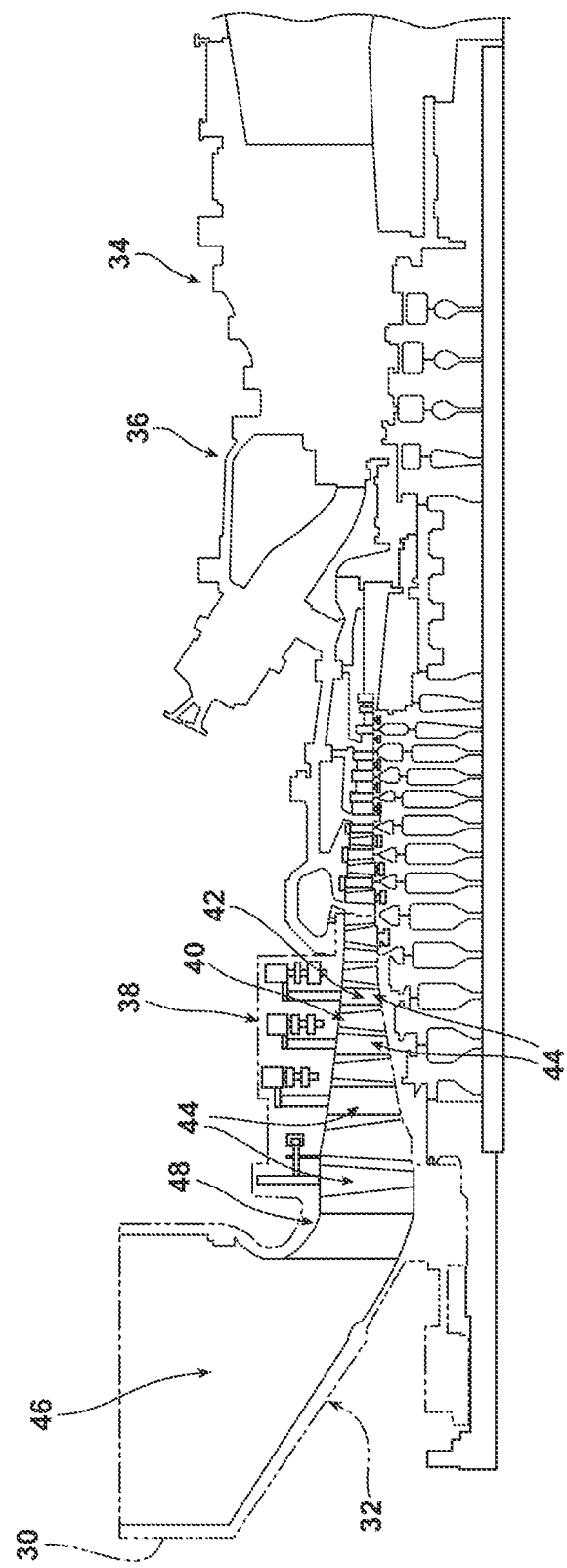
FIG. 3 is a gas turbine engine configured in accordance with aspects of the present invention.

Referring to FIG. 3, the gas turbine engine 10 is illustrated including a compressor 32, a turbine 34, and a combustor section 36 for receiving compressed air from the compressor 32 and combining the compressed air with fuel to produce a hot working gas supplied to the turbine 34. The compressor 32 of the present engine 10 may be described with reference to a prior art engine configuration, referred to herein as a "reference engine". In accordance with the above described aspect of the invention, the compressor 32 is configured to supply a larger volume of air to the combustor section 36 and turbine 34 than a compressor of the reference engine designed to supply air to the same combustor section 36 and turbine 34 for maximum power output at a maximum or optimum efficiency, wherein the comparison of engine outputs is performed at constant conditions. That is, the comparison of engine outputs is performed at a predetermined compressor inlet condition corresponding to a target inlet temperature, target relative humidity and target atmospheric pressure, e.g., ISO conditions or any other predetermined target conditions.

In accordance with an aspect of the invention, the increased volume of the compressor 32 may be implemented by providing enlarged front stages to the compressor 32 to allow for a high mass flow, as is illustrated in FIG. 3 by the dotted outline portion 30 surrounding a portion of the front of a compressor of the reference engine. Specifically, in comparison to the compressor of the reference engine the compressor 32 is provided with a larger compressor casing 38, including a larger outer diameter, and including larger compressor airfoils, i.e., larger (span and/or chord) compressor blades 40 and vanes 42. Hence, the blades 40 and vanes 42 are configured to move a greater volume of air through the compressor 32. In accordance with a further aspect of the invention, about the front one-third of the stages of the compressor, at an inlet end thereof, are sized with a larger outer diameter than the corresponding stages of the compressor of the reference engine and, in the illustrated example, the first through the fifth stages of the compressor 32 are provided with a larger outer diameter and larger compressor airfoils.

Further, the inlet to the compressor 32, including the inlet manifold 46 and inlet casing 48, are enlarged to allow a higher volume of air flow into the compressor 32. Variable airfoils for controlling the flow of air from the inlet casing 48 into the entrance to the compressor and comprising inlet guide vanes (IGVs) 44 are also enlarged. In accordance with another aspect of the invention, four rows of IGVs 44 may be provided to control flow of air into the compressor 32, wherein the plural rows of IGVs 44 facilitate maintaining compressor efficiency as the IGVs 44 are rotated to different rotational positions to increase or limit flow of air into the compressor 32.

The reconfigured compressor 32 of the engine 10 may be described with reference to a prior art engine configuration. In a specific exemplary embodiment, the prior art engine may be a Siemens engine model SGT6-5000F. As noted above, the prior art engine is referred to as a "reference engine," wherein the compressor 32 and turbine 34 of the gas turbine engine 10 of the present invention are configured with reference to the reference engine. The reference engine is defined as an engine designed with a configuration having a predetermined mass flow for a predetermined turbine inlet temperature to produce an optimum efficiency at the predetermined (target) compressor inlet condition at a maximum power output for the reference engine. For example, such an engine may operate at a base load maximum output with IGVs, if so provided, in a fully open or full flow position. It should be noted that a "fully open" position of the IGVs refers to a predefined limit for moving the IGVs toward an open position, which position may not correspond to a full extent of available physical movement of the IGVs. The turbine 34 of the present engine 10 comprises a configuration substantially identical to the turbine of the reference engine. That is, the turbine 34 is configured to have a maximum power and optimum efficiency when provided with a mass flow and turbine inlet temperature that is the same as the reference engine. Further, the combustor section 36 of the present engine 10 can be the same as the combustor section of the reference engine.

The compressor 32 of the engine 10 is provided with a configuration different than the compressor of the reference engine, wherein the compressor 32 is sized larger than the compressor of the reference engine to provide a larger volume of air with a maximum flow capability of the compressor 32 that is greater than an upper mass flow capability of the compressor of the reference engine. Further, the compressor 32 provides a higher pressure ratio with a higher surge limit than the reference engine.

The IGVs 44 of the engine 10 are rotated to a base load position, defined for this engine as a position at 0 degrees, restricting the mass flow of air to the engine 10 at a base load point of operation (for the predetermined or target compressor inlet condition) to produce a power output that is generally equal to the maximum power output of the reference engine at its optimum efficiency. At base load operation, the engine 10 operates at an optimum efficiency for the engine 10. Hence, base load operation of the engine 10 may be characterized as operation of the engine 10 at part load and an optimum efficiency while producing a power output equal to the maximum power output of the reference engine operated at optimum efficiency and operated with the same turbine inlet temperature.

Moving the IGVs 44 to a reduced angle to permit a greater mass air flow into the compressor 32 produces an increased power output from the engine 10 for a given load. For example, in accordance with an aspect of the invention, the IGVs 44 may be moved from the base load position to an unrestricted, or full mass flow, position to provide an increase in mass flow of air into the compressor 32 greater than 5% of the mass flow for the base load point, with a corresponding increase in output power of about 5%. More preferably, and in accordance with preferred aspects of the invention, the engine 10 provides an increase in mass flow of air into the compressor 32 of at least about 10% with a corresponding increase in output power of about 10% at high ambient conditions, e.g., with ambient temperatures higher than the temperature associated with the predetermined or target compressor inlet condition. As noted above, the increase in mass flow with accompanying increase in power output for a given load is obtained while maintaining the turbine inlet temperature constant, i.e., at the base load turbine inlet temperature, thereby avoiding an impact on the life expectancy of the turbine components that might otherwise occur if the turbine inlet temperature were increased to increase power. Further, as the engine power increases above the base load point of operation, the engine efficiency decreases approaching full power.

In addition to providing the ability to increase power above the base load operation point for the engine 10 by opening the IGVs 44, the IGVs 44 may be moved from the base load position to an increased pivot position, or increased angle from the 0 degree position, further restricting the mass flow of air into the compressor 32 below the mass flow provided at base load operation, for effecting a turn-down or part load operation. The IGVs 44 for the engine 10 may close down or reduce the volume of air flow to a value at part load that is at least about 20% below the volume provided to the reference engine operating at base load. The decreased flow provided through the compressor 32 does not adversely affect emissions at turn-down, such that turn-down operation may be implemented while maintaining emissions, such as NOx and CO, at acceptable reduced levels.

The power output of the engine 10 may be controlled over a large range of adjustability, from about 10% above the base load operating point at maximum power to a turn-down of approximately 15% below the base load. Further, control of the power output through control of the mass flow of air into the compressor 32 enables an improved ability of the engine 10 to ramp up and ramp down power quickly to follow the load requirements of the power grid 14.

Moving the optimum performance design of the engine 10 to a part load point enables several favorable scenarios for owner/operators. A particularly advantageous aspect of this engine 10 is that it enables operations typically associated with two types of power generation to be built into one engine. That is, the use of a base load plant and a peaking turbine engine, or "peaker" can be combined. The engine 10 can operate at a "base load" at its optimum efficiency. In a scenario where the grid 14 would have typically needed to dispatch a peaker, the base loaded engine can ramp in its remaining load to offer additional power. This remaining power results in an overall efficiency reduction for the base loaded unit, but when compared to operating the base loaded unit and then dispatching an additional high efficiency peaking unit, the efficiency loss may be overcome by the fact that the peaking engine did not have to be started. Starting is a low efficiency activity and the total time at high load may be limited, therefore the combined power output of two high efficiency facilities may in fact have a lower overall efficiency than the one engine operated at a point beyond is optimum design point, i.e., temporarily at a lower efficiency.

This advantage in efficiency which results when coupling the function of two units into one engine 10 extends to emissions as well. The highest emissions from a gas turbine engine typically occur during the start-up operation for the engine. Avoiding the need to start a second, or even third, small unit, i.e., a peaking unit, results in an overall improvement in the environmental footprint produced when generating the needed output.

Another application for this design capability is seen with units that experience periodic high ambient conditions. Gas turbine engines typically control the mass flow to the engine through control of changes in volume flow. During ambient conditions that are hotter, the air entering the engine is less dense, such that the same volume flow of air entering the engine results in less mass flow. Designing the engine such that a higher volume flow of air, and therefore excess mass flow, can be offered at high ambient conditions offers users an opportunity to increase power on hot days.

The engine 10 described herein offers power above the engine's maximum efficiency point for a given ambient condition, and given operating temperature, through an increase in volume flow and/or mass flow and not through increases in operating temperature. From the maximum efficiency point at the base load operating point, the engine is controlled such that the mass flow increases along an operating curve that maintains engine maximum temperature at a level very similar to, or lower than the level at the maximum efficiency point. This system allows for several power settings at a given ambient point, allowing for setting for the engine to move to a theoretical, empirically calculated, or measured maximum efficiency point for that ambient condition, and to a power level above that point by increasing the mass flow.

Figure 4:
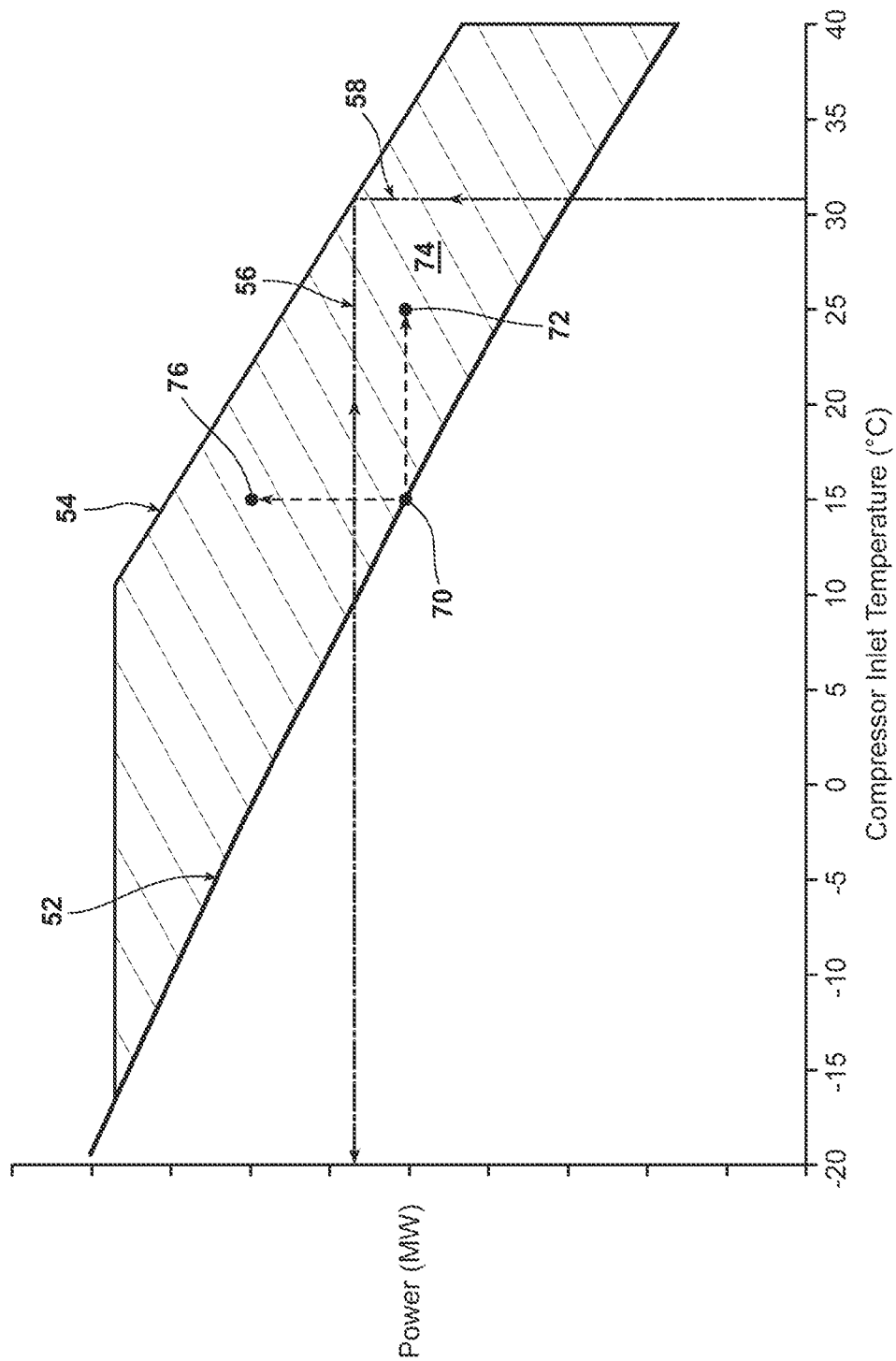
FIG. 4 is a graph illustrating a range of operation provided by a gas turbine engine in accordance with aspects of the present invention.

Advantageous aspects of providing the compressor 32 with additional volume flow capacity for meeting varying power needs and for maintaining a desired power level are illustrated in FIG. 4. Line 52 illustrates the output of the gas turbine engine 10 that may occur as the ambient or inlet temperature to the compressor 32 increases, without compensating for the corresponding decrease in mass flow with the increasing temperature. Line 54 illustrates a maximum power output of the engine 10 for different temperatures, which line 54 represents a maximum power output of the engine 10 above a base load operating power normally required of the engine 10. An additional mass flow of air into the engine 32 may be provided by opening the IGVs 44 to permit an additional volume flow of air to compensate for the reduced air density as the temperature increases, as depicted by a horizontal line 56 extending between the lines 52, 54 and illustrating a first mode of operation in which the engine may be operated at a flat or constant power output with increasing ambient temperature. Also depicted in the FIG. 4 is the available increase in power between lines 52 and 54 at a fixed ambient or compressor inlet temperature, as depicted by vertical line 58 and illustrating a second mode of operation. The gas turbine engine 10 may be operated at the different operating points between the lines 52, 54, depicted as a shaded shaping power area 74 in FIG. 4, and as exemplified in particular by the lines 56, 58, without impacting the service interval for the engine. That is, the additional ranges of operating points for the engine 10 are provided within the normal operating temperatures of the engine 10 such that aspects affecting the service interval of the engine components, such as increased component temperatures, are not affected.

In accordance with an aspect of the invention, the line 52 corresponds to the power output of the reference engine when operated at optimum efficiency, generally providing a base load output with optimum efficiency at the predetermined or target compressor inlet condition. The operating area provided to the right of the operating line 52 defined for the reference or conventional engine is referred to as "shaping power" in that this power is readily available in the present engine 10 to meet an increased power need within a short time period, and is capable of doing so within the normal operating temperature parameters of the engine 10 without adversely affecting the part life of the components in the turbine of the engine 10. Hence, the increased power output may be selectively applied (shaped) to generally meet or fill power variations in the power grid requirements, such as may result from fluctuations in the power supplied from renewable power sources, e.g., wind and/or solar power, as well as to address variations in environmental conditions, such as an increasing temperature of the ambient air provided to the compressor.

Figure 5:
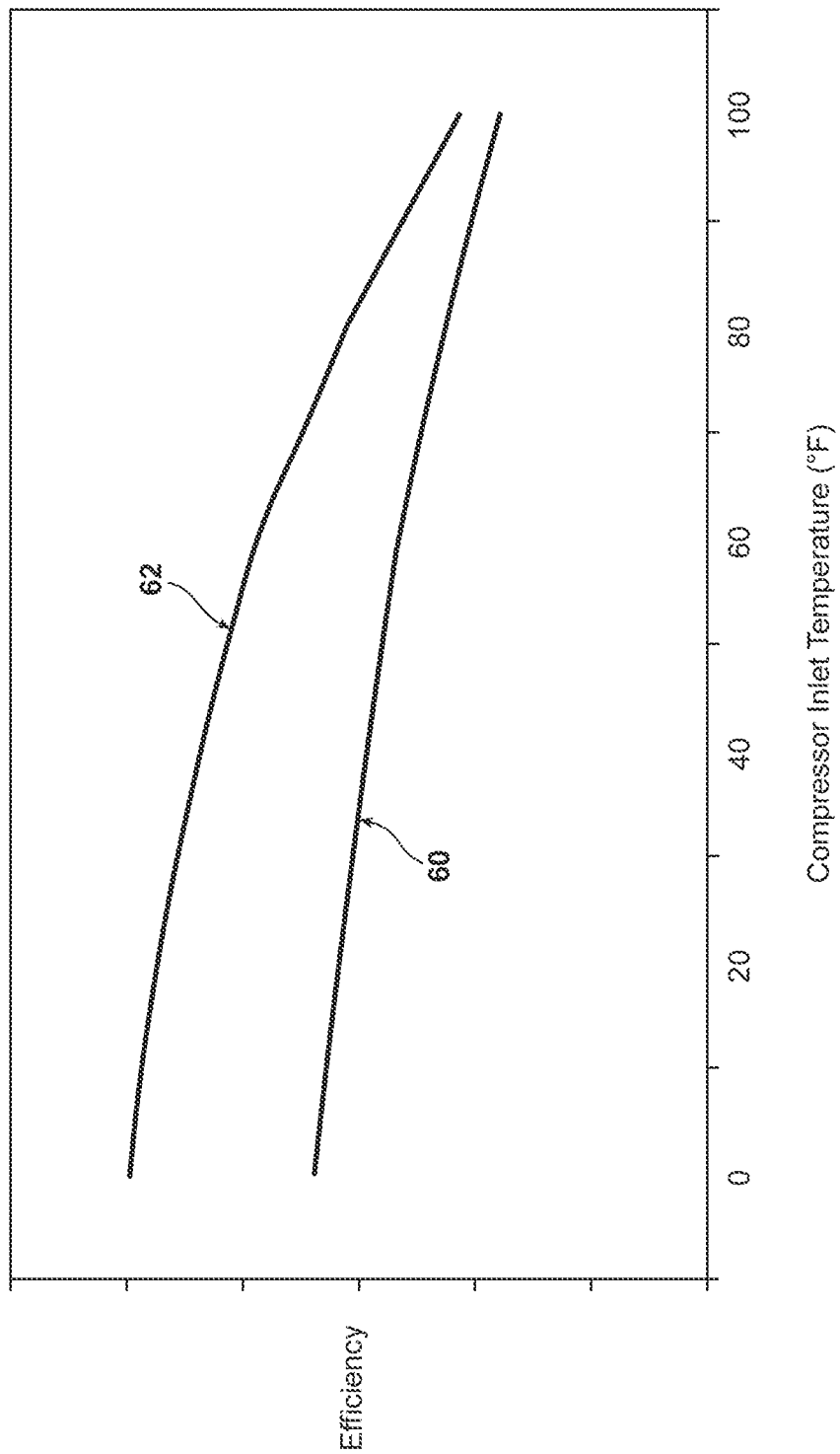
FIG. 5 is a graph illustrating a comparison of efficiency of a gas turbine engine configured in accordance with aspects of the present engine relative to a known gas turbine engine.
Figure 6:
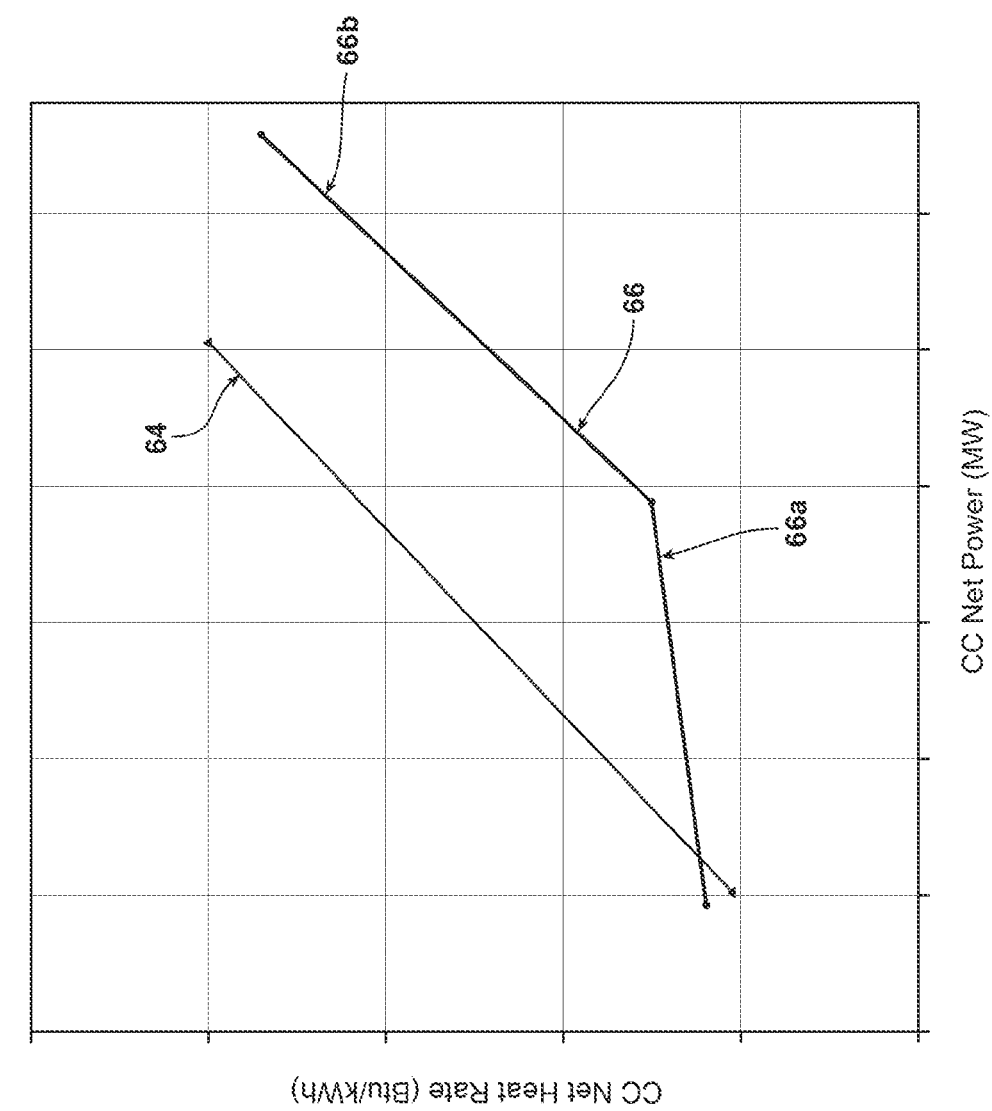
FIG. 6 is a graph comparing operation of a combined cycle power plant incorporating a gas turbine engine configured in accordance with aspects of the present engine combined with duct firing relative to a combined cycle power plant incorporating a known gas turbine engine combined with duct firing.

FIG. 5 illustrates a variation in efficiency of the present gas turbine engine 10 with changing inlet temperature, as depicted by line 60, in comparison to a variation in efficiency of the above described "reference engine" with changing inlet temperature, as depicted by line 62. It should be understood that the rate of decrease of efficiency of the present engine 10 with varying inlet temperature may be offset or reduced by opening the IGVs 44 with increasing temperature, corresponding to movement along the line 56 to the right in FIG. 4. Further, it can be seen that the rate at which engine efficiency decreases with increasing temperature is reduced for the engine of the present invention as compared to the "reference engine".

In a particular example of the first mode of operation, the engine 10 may have a "base load" operating point, i.e., a normal operating point at a part load below the maximum power for the engine 10, as indicated by a point 70 in FIG. 4. As the ambient temperature increases, the IGVs 44 are opened to operate at the same power and an increased inlet temperature, as indicated by an exemplary point 72 to the right of 70. Hence, the IGVs may be moved to maintain the same power as the temperature either increases, with a corresponding movement of the IGVs toward a more open position, or decreases, with a corresponding movement of the IGVs toward a more closed position.

In a particular example of the second mode of operation, the engine 10 may have the same base load operating point as the above example, and indicated by 70 in FIG. 4. However, the IGVs are moved toward the open position at a fixed ambient temperature to operate at an increased power, as indicated by an exemplary point 76 above 70. The exemplary point 76 represents an operating point that may be provided by the engine 10 in response to an increased demand for power on the power grid 14. Alternative operating points, such as is exemplified by operating points 72, 74, may be located at any power output level generally bounded by lines 56 and 54 without affecting a service interval influenced by temperatures of the hot working gas within the turbine of the engine 10.

In accordance with a further aspect of the invention, the gas fired power plant 12 may comprise a combined cycle power plant including both a gas turbine engine 10 and a steam turbine 11 (FIG. 1), used in a bottoming cycle. The bottoming cycle takes unused energy from the gas turbine engine 10, such as heat energy in the exhaust gases from the gas turbine engine 10, and converts the energy into usable output power for the power plant 12. In order to increase the power output, such as to meet a peaking requirement of the power grid 14, duct firing may be implemented to increase the temperature of the turbine exhaust gases provided to a heat exchanger, such as a heat recovery steam generator (HRSG) 8 producing steam for the steam turbine 11. For example, additional fuel may be added to and burned with remaining oxygen in the exiting turbine exhaust gases to increase the gas temperature provided to the HRSG 8 to produce additional steam.

In a power plant incorporating a conventional gas turbine with steam bottoming cycle, substantially all of the additional power output for supplying peaking power is provided by duct firing at the expense of a relatively steep increase in the net heat rate for the combined cycle, as illustrated by line 64 in FIG. 5. In contrast, in accordance with an aspect of the invention, the combined cycle gas fired power plant 12 incorporating the gas turbine 10 provides an initial additional power output at the expense of a relatively small increase in the net heat rate for the combined cycle, indicated by section 66a of line 66 in FIG. 5, as the output of the gas turbine engine 10 increases to its maximum power. Subsequently, the output of the gas fired power plant 12 may be further increased using conventional duct firing, as indicated by section 66b of line 66 in FIG. 5.

In other words, the initial increased net power output of the power plant 12 is provided by moving the IGVs to increase mass flow of air through the engine 10, while maintaining a constant turbine inlet temperature, and may be accomplished at a first "net power cost increase" represented by the slope of [(change in net heat rate)/(change in net power output)] along section 66a of line 66. Subsequently, the net power plant output is increased further by providing duct firing to increase steam production in the HRSG. The duct firing provides an increase in the net power output of the power plant 12 at a second "net power cost increase" represented by the slope of [(change in net heat rate)/(change in net power output)] along section 66b of line 66, which is substantially greater than the first net power cost increase of section 66a. In particular, the second net power cost increase (slope of line 66b) is about eight times greater than the first net power cost increase (slope of line 66a).

At the first net power cost increase, the net power output of the power plant 12 is increased at least 10% above the base load output with a corresponding increase in net heat rate of less than 2%, and more particularly at an increase in net heat rate of about 0.5%. At the second net power cost increase, the net power output of the power plant 12 is increased about 10%, subsequent the power increase provided at the first net power cost increase, with a corresponding increase in net heat rate of greater than 2%, and more particularly at an increase in net heat rate of about 3.5%. Hence, the second net power cost increase associated with duct firing is about eight times greater than the first net power cost increase associated with providing an increased mass flow through the engine. Further, the net power increase associated with the lower first net power cost increase is at least equal to or greater than the net power increase associated with the second net power cost increase. Accordingly, incorporating the gas turbine engine 10 in a combined cycle power plant 12 may provide additional energy savings, and therefore cost savings, relative to a combined cycle power plant utilizing a gas turbine engine having a conventional configuration, i.e., a conventional engine configured to provide a maximum design power output for the engine when operating at a base load.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A gas turbine engine system configured for power generation, the gas turbine engine system comprising:
  a compressor, a combustor and a turbine, the compressor providing compressed air to the combustor for combustion with a fuel to produce a hot working gas and the turbine receiving the hot working gas to produce power;

the compressor and turbine of the gas turbine engine system being configured with reference to a reference engine, the reference engine defining a configuration having a predetermined compressor upper mass flow of air for a predetermined turbine inlet temperature to produce an optimum engine efficiency at a predetermined compressor inlet condition at a maximum power output for the reference engine, wherein the predetermined compressor inlet condition comprises ISO conditions for a gas turbine engine;

the turbine comprising a configuration substantially identical to a turbine of the reference engine;

the compressor having a configuration different than a compressor of the reference engine, wherein the compressor is sized larger than the compressor of the reference engine to provide a maximum flow capability of the compressor greater than an upper flow capability of the compressor of the reference engine;

wherein the compressor comprises inlet guide vanes (IGVs) at an inlet to the compressor, the IGVs having a predetermined position for operating the gas turbine engine system at an optimum efficiency at the predetermined turbine inlet temperature, wherein the predetermined position of the IGVs reduces the mass flow of air into the compressor to a flow less than the maximum flow capability; and wherein the compressor comprises a plurality of stages, each stage defined by a row of stationary vanes and a row of rotating blades, and wherein about a front one-third of the stages of the compressor, at an inlet end thereof, are sized with a larger outer diameter than the corresponding stages of the compressor of the reference engine.

2. The gas turbine engine system of claim 1, wherein the predetermined position of the IGVs defines a mass flow of air entering the compressor for producing a base load output, and opening the IGVs from the predetermined position toward a more open position increases the power output of the gas turbine engine system.

3. The gas turbine engine system of claim 2, wherein the movement of the IGVs toward the more open position produces the increase in power output at a constant turbine inlet temperature defined by the predetermined turbine inlet temperature.

4. The gas turbine engine system of claim 3, wherein the increase in power output is an increase of at least 10% above the base load output with the movement of the IGVs toward the more open position.

5. The gas turbine engine system of claim 4, wherein the IGVs are movable from the predetermined position toward a closed position, reducing the mass flow of air to the compressor, wherein the IGVs are adapted to reduce the mass flow of air into the compressor at least 20% below the mass flow of air at the base load power output to provide a reduced part load power output.

6. The gas turbine engine system of claim 2, wherein the movement of the IGVs toward the more open position is adapted to provide a constant base load power output with increasing compressor inlet air temperatures above the predetermined compressor inlet condition.

* * * * *